(12) United States Patent
Chen (10) Patent No.: US 10,533,736 B2
(45) Date of Patent: Jan. 14, 2020

(54) INFRARED-SENSITIVE LIGHTING DEVICE

(71) Applicant: LivingStyle Enterprises Limited, Dong Guan (CN)

(72) Inventor: Ming-Yun Chen, Dong Guan (CN)

(73) Assignee: LIVINGSTYLE ENTERPRISES LIMITED, Dong Guan (CN)

( * ) Notice: Subject to any disclaimer, the term of this patent is extended or adjusted under 35 U.S.C. 154(b) by 0 days.

(21) Appl. No.: 16/094,537

(22) PCT Filed: May 27, 2017

(86) PCT No.: PCT/CN2017/086356
§ 371 (c)(1),
(2) Date: Oct. 18, 2018

(87) PCT Pub. No.: WO2017/206839
PCT Pub. Date: Dec. 7, 2017

(65) Prior Publication Data
US 2019/0101274 A1 Apr. 4, 2019

(30) Foreign Application Priority Data
Jun. 1, 2016 (CN) ..................... 2016 2 0526812 U (51) Int. Cl.
*F21V 23/04* (2006.01)
*G01J 5/04* (2006.01)
*G01J 5/08* (2006.01)
*F21V 21/02* (2006.01)

(52) U.S. Cl.
CPC ............ *F21V 23/0471* (2013.01); *G01J 5/04* (2013.01); *G01J 5/0806* (2013.01); *F21V 21/02* (2013.01)

(58) Field of Classification Search
CPC .... F21V 23/0471; F21V 21/02; G01J 5/0806; G01J 5/04
See application file for complete search history.

(56) References Cited

U.S. PATENT DOCUMENTS 6,196,705 B1 * 3/2001 Finke ...................... F21V 21/26
362/276
2005/0205790 A1 * 9/2005 Noguchi ................... G01J 5/08
250/353

FOREIGN PATENT DOCUMENTS

CN 205782728 U * 12/2016 ............... F21V 5/04

* cited by examiner

*Primary Examiner* — Joseph L Williams
(74) *Attorney, Agent, or Firm* — WPAT, PC (57) ABSTRACT

An infrared-sensitive lighting device includes a host, a light-emitting module and an infrared sensing module. The light-emitting module is disposed on the host. The infrared sensing module includes a casing, a circuit board, a sensor and a lens cover. The casing is installed on the host and has an opening. The circuit board is disposed within the casing. The sensor is installed on the circuit board and aligned with the opening. The lens cover is rotatably mounted on the opening. The lens cover has a lens pattern. When the lens cover is in a first state, the sensor performs a sensing operation at a first direction angle through the lens pattern. When the lens cover is in a second state, the sensor performs the sensing operation at a second direction angle through the lens pattern.

16 Claims, 10 Drawing Sheets

INFRARED-SENSITIVE LIGHTING DEVICE

FIELD OF THE INVENTION

The present invention relates to an infrared-sensitive lighting device, and more particularly to an infrared-sensitive lighting device capable of being installed in various environments, in which the sensing angle or direction of the infrared-sensitive lighting device can be effectively adjusted.

BACKGROUND OF THE INVENTION

Conventionally, the general lighting device or lamp uses an incandescent light bulb, a light tube or a power-saving light bulb as a light-emitting element to provide illumination. With the advancement of science and technology, the design of the light-emitting diode (LED) as the light-emitting element is becoming more widespread and the light-emitting diode provides better lighting effects.

Nowadays, the awareness of environmental protection is gradually increased. It is an important issue to effectively utilize and develop resources with regenerative characteristics. As known, sunlight is an inexhaustible, inexhaustible, natural and clean source. For example, a solar panel is used to convert sunlight into electric energy, or the electric energy is further stored in a solar cell. That is, the solar panel and the solar cell can provide electric energy to associated devices. In addition, the lighting device or lamp using a motion sensing technology to control the on/off states of the light-emitting element is effective to achieve the power-saving benefit.

According to the motion sensing technology, a sensor is installed on a lighting device or lamp to sense the motion change of an object or the intensity change of the ambient light. Consequently, the on/off states of the light-emitting element are automatically controlled according to the change in the sensing area. The sensor for implementing the motion sensing technology includes a passive infrared sensor (PIR sensor) or a microwave sensor. For example, the associated technologies are disclosed in Chinese Patent Application No. 200520000991.X and 200810097926.1.

As the power-saving sensing applications become diversified, the space lighting devices or the security photography devices are operated according to the infrared (IR) sensing technology. Consequently, the manufacturers make efforts to increase the applications of the devices. For example, the lighting device with the automatic sensing function can be installed outdoors in combination with solar energy technology, so that the converted electric energy can be stored during daytime or sunny days. Alternatively, the lighting device is selectively installed indoors to use the utility power source or installed outdoors to use the solar energy. Alternatively, the lighting device is installed on an indoor wall in a wall-mounting manner or installed on the indoor ceiling in a suspension manner.

In case that the structure of the lighting device is specially designed, the lighting device can be used in different environments while increasing the diversity of the application and saving the development cost of different products. However, there are still some drawbacks. For example, the installation environment of the lighting device and the sensitivity condition (e.g., specified angle limitation or direction) of the infrared (IR) sensing technology influence the operating efficacy of the lighting device. In case that the installation position of the lighting device is changed from a wall to a ceiling and the sensing angle or direction is not accurately adjusted, the sensing area is improper and the function of automatically controlling the on/off states of the light-emitting element is adversely affected.

For solving the above drawbacks, many complicated rotation mechanisms are employed. By the rotation mechanisms, the sensing angle or direction of the overall sensing element, sensing mechanism or sensing module is correspondingly adjusted according to the installation position of the overall lighting device.

For solving the drawbacks of the conventional technologies, there is a need of providing an improved lighting device using a simpler technology.

SUMMARY OF THE INVENTION

For solving the drawbacks of the conventional technologies, the present invention provides an infrared-sensitive lighting device. The infrared-sensitive lighting device can be installed in different environments. The sensing angle or direction of the infrared-sensitive lighting device is effectively adjustable. Moreover, the infrared-sensitive lighting device has a simple structure and is easily operated.

In accordance with an aspect of the present invention, there is provided an infrared-sensitive lighting device. The infrared-sensitive lighting device includes a host, a light-emitting module and an infrared sensing module. The host is installed on an installation surface. The light-emitting module is disposed on the host. The light-emitting module emits a light beam to provide a lighting behavior. The infrared sensing module includes a casing, a circuit board, a sensor and a lens cover. The casing is installed on the host and has an opening. The circuit board is disposed within the casing. The sensor is installed on the circuit board and aligned with the opening. The lens cover is rotatably mounted on the opening. The lens cover has a lens pattern. When the lens cover is rotated relative to the opening and the lens cover is in a first state, the sensor performs a sensing operation at a first direction angle through the lens pattern. When the lens cover is rotated relative to the opening and the lens cover is in a second state, the sensor performs the sensing operation at a second direction angle through the lens pattern.

In an embodiment, the sensor is a passive infrared sensor.

In an embodiment, the light-emitting module includes one or more light-emitting diode units.

In an embodiment, the infrared-sensitive lighting device is connected with a power source to receive electric energy. The power source is a utility power source, a battery group or a solar power module.

In an embodiment, the installation surface is a wall or a ceiling, the host has a backside, and the backside of the host is installed on the wall in a wall-mounting manner or installed on the ceiling in a suspension manner.

In an embodiment, the circuit board includes a sensing signal receiving and amplifying circuit for amplifying a sensing result of the sensor and outputting an amplified sensing result. According to the amplified sensing result, the host controls the lighting behavior of the light-emitting module.

In an embodiment, the lens cover further includes two protrusion structures, and the infrared sensing module further includes a clamping part for clamping the circuit board. While the lens cover is rotated and a position-limiting structure of the clamping part is contacted with and stopped by one of the two protrusion structures, the lens cover is in the first state or the second state.

In an embodiment, the lens cover further includes a rotary ring. The rotary ring is aligned with the opening and rotatably mounted on the opening. The two protrusion structures are formed on an inner side of the rotary ring and protruded toward the circuit board.

In an embodiment, the casing includes an indication post, and the rotary ring has a first mark and a second mark. When the lens cover is rotated and the first mark is aligned with the indication post, the lens cover is in the first state. When the lens cover is rotated and the second mark is aligned with the indication post, the lens cover is in the second state.

In an embodiment, the lens cover further includes a waterproof ring, wherein the waterproof ring is formed on the inner side of the rotary ring and aligned with a periphery of the opening.

In an embodiment, when the lens cover is rotated at 180 degrees, the lens cover is switched from the first state to the second state or switched from the second state to the first state.

In accordance with an aspect of the present invention, there is provided an infrared-sensitive lighting device. The infrared-sensitive lighting device includes a host, a light-emitting module and an infrared sensing module. The host is installed on an installation surface. The light-emitting module is disposed on the host. The light-emitting module emits a light beam to provide a lighting behavior. The infrared sensing module includes a casing, a circuit board with a sensor, and a lens cover. The casing is installed on the host and has an opening. The circuit board is fixed in the casing and aligned with the opening. The lens cover is rotatably mounted on the opening. The lens cover has a lens pattern. When the lens cover is rotated relative to the opening and the lens cover is in a first state, the sensor performs a sensing operation at a first direction angle through the lens pattern. When the lens cover is rotated relative to the opening and the lens cover is in a second state, the sensor performs the sensing operation at a second direction angle through the lens pattern.

In an embodiment, the installation surface is a wall or a ceiling, the host has a backside, and the backside of the host is installed on the wall in a wall-mounting manner or installed on the ceiling in a suspension manner.

In an embodiment, the circuit board includes a sensing signal receiving and amplifying circuit for amplifying a sensing result of the sensor and outputting an amplified sensing result. According to the amplified sensing result, the host controls the lighting behavior of the light-emitting module.

In an embodiment, the lens cover further includes two protrusion structures, and the infrared sensing module further includes a clamping part for clamping the circuit board. While the lens cover is rotated and a position-limiting structure of the clamping part is contacted with and stopped by one of the two protrusion structures, the lens cover is in the first state or the second state.

In an embodiment, the lens cover further includes a rotary ring. The rotary ring is aligned with the opening and rotatably mounted on the opening. The two protrusion structures are formed on an inner side of the rotary ring and protruded toward the circuit board.

From the above descriptions, the present invention provides an infrared-sensitive lighting device. In case that the infrared-sensitive lighting device is installed in different environments, the sensing angle or direction can be effectively adjusted. Consequently, the applications of the infrared-sensitive lighting device become more diverse, and the function of automatically controlling the lighting operation is achievable. Even if the infrared-sensitive lighting device of the present invention has a simplified structure, the above purposes can be achieved.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1A:
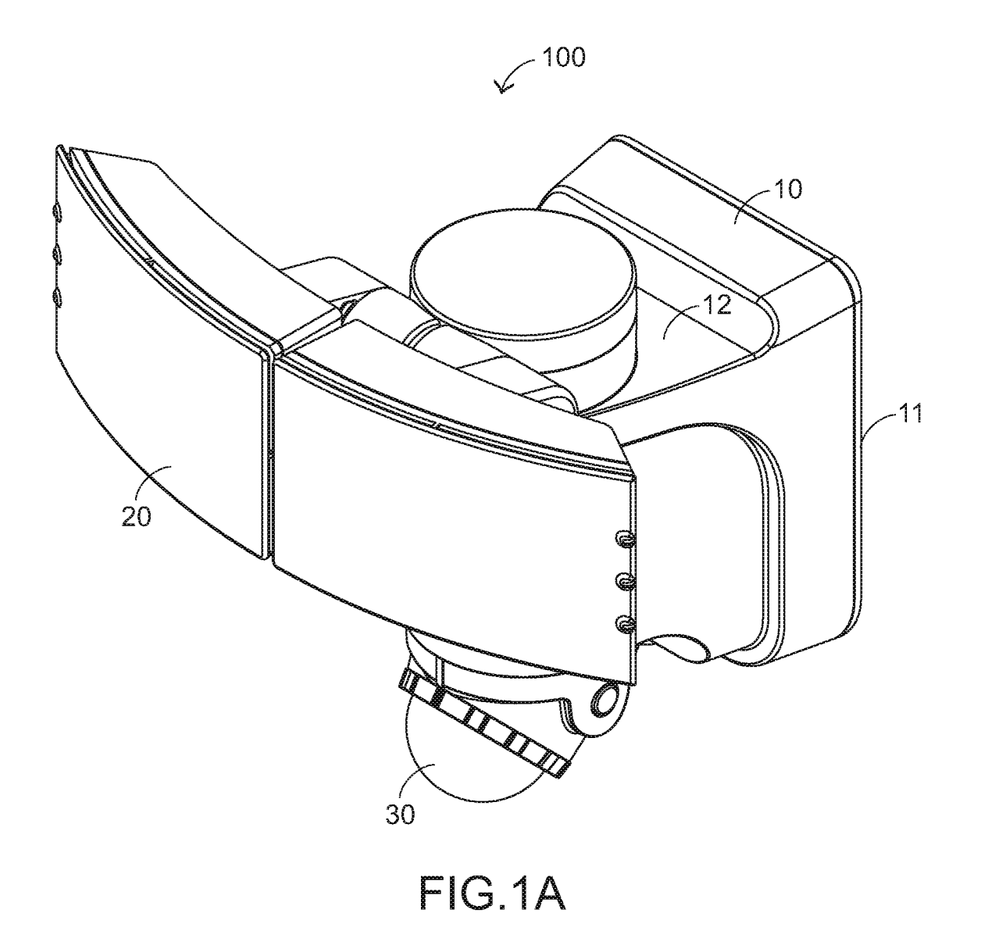
FIG. 1A is a schematic perspective view illustrating an infrared-sensitive lighting device according to an embodiment of the present invention.
Figure 1B:
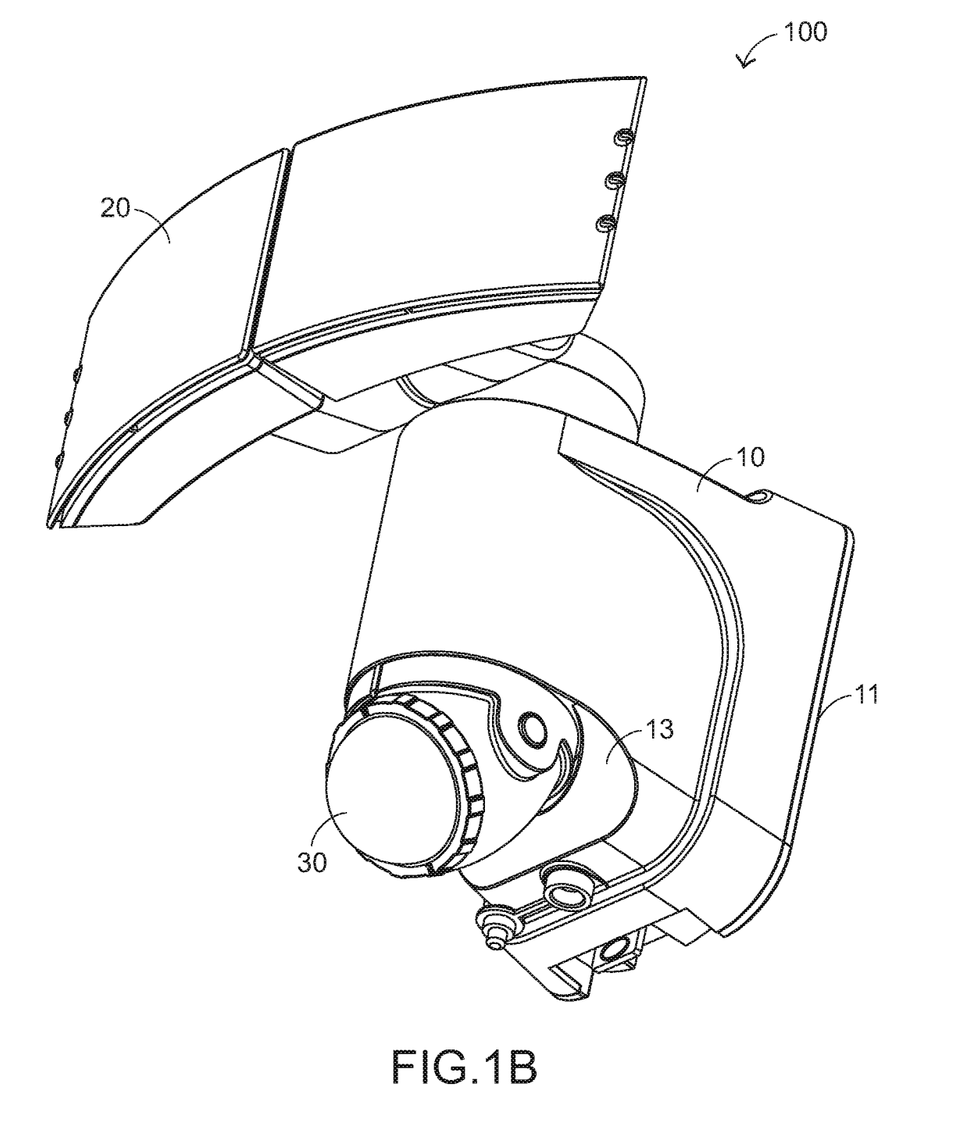
FIG. 1B is a schematic perspective view illustrating the infrared-sensitive lighting device as shown in FIG. 1A and taken along another viewpoint.

Hereinafter, an example of an infrared-sensitive lighting device will be illustrated with reference to FIGS. 1A and 1B. FIG. 1A is a schematic perspective view illustrating an infrared-sensitive lighting device according to an embodiment of the present invention. FIG. 1B is a schematic perspective view illustrating the infrared-sensitive lighting device as shown in FIG. 1A and taken along another viewpoint. As shown in FIGS. 1A and 1B, the infrared-sensitive lighting device 100 comprises a host 10, a light-emitting module 20 and an infrared sensing module 30. The light-emitting module 20 and the infrared sensing module 30 are installed on the host 10.

For effectively operating the light-emitting module 20, the light-emitting module 20 is located at a top side 12 of the host 10 to emit a light beam and provide illumination. In an embodiment, the light-emitting module 20 comprises one or more light-emitting diode units. In some other embodiments, the light-emitting module 20 comprises one or more other types of light-emitting units. The structure of the light-emitting module 20 is specially designed such that the light-emitting module 20 is rotatable relative to the host 10. When the light-emitting module 20 faces downwardly, the light beam from light-emitting module 20 is effectively projected to a corresponding sensing area.

The infrared-sensitive lighting device 100 further comprises a power connection port (not shown). Moreover, the infrared-sensitive lighting device 100 comprises associated circuit structures. These circuit structures are electrically connected with the corresponding components in the host 10. These components include the light-emitting module 20, the infrared sensing module 30 and the power connection port. The power connection port is connected with a power source to receive electric energy. The power source is an external utility power source or a solar power module.

The infrared-sensitive lighting device 100 further comprises a battery holder (not shown). The battery holder is disposed within the host 10. In case that the power source is a battery group, the battery group can be assembled with the battery holder. In some other embodiments, the solar power module is a part of the infrared-sensitive lighting device 100.

In an embodiment, the infrared-sensitive lighting device 100 is installed on an installation surface through a backside 11 of the host 10. The installation surface is a wall or a ceiling, which will be described later. That is, the infrared-sensitive lighting device 100 is installed on the wall in a wall-mounting manner or installed on the ceiling in a suspension manner through the backside 11 of the host 10. The structure of the infrared-sensitive lighting device 100 as shown in FIGS. 1A and 1B is presented herein for purpose of illustration and description only. It is noted that numerous modifications and alterations of the structure of the infrared-sensitive lighting device 100 may be made while retaining the teachings of the invention. Consequently, the infrared-sensitive lighting device 100 can be installed in various environments.

Figure 2A:
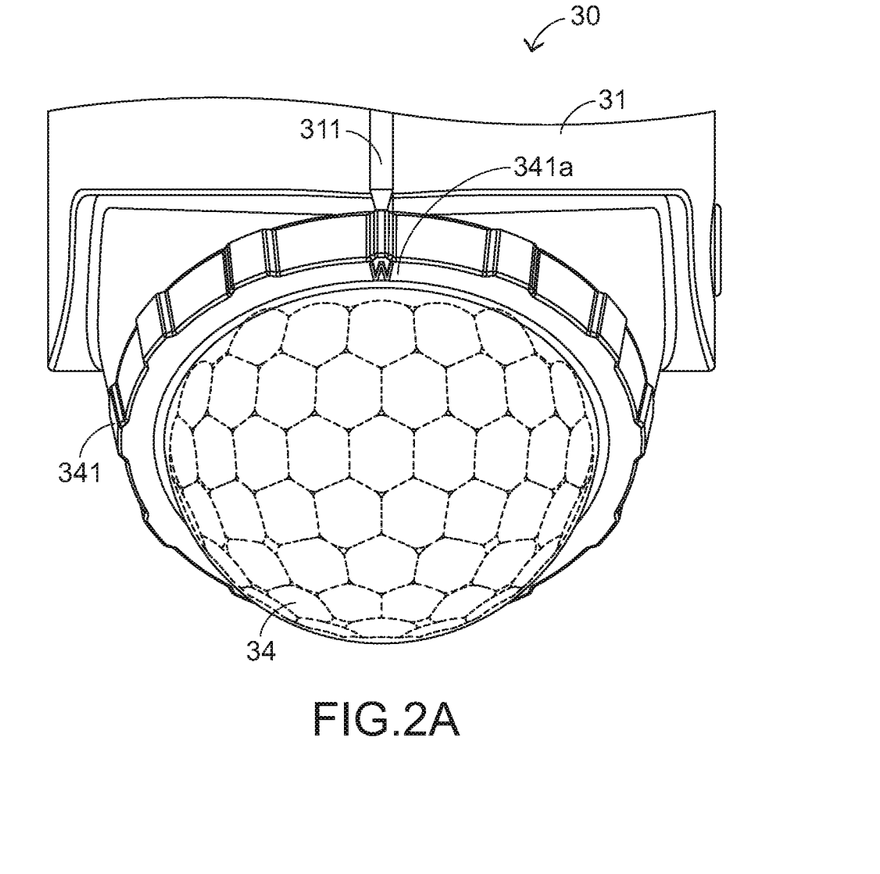
FIG. 2A is a schematic enlarged fragmentary perspective view illustrating the infrared sensing module of the infrared-sensitive lighting device according to the embodiment of the present invention.
Figure 2B:
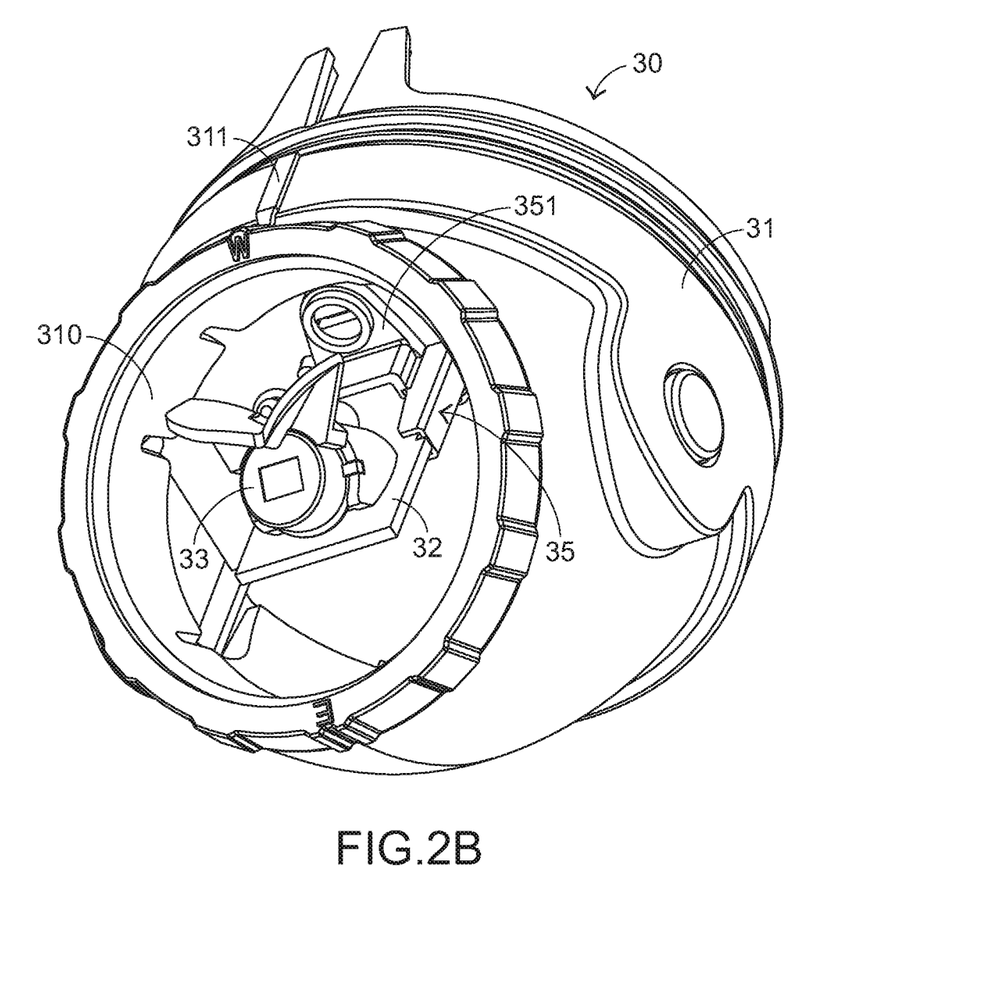
FIG. 2B is a schematic perspective view illustrating a portion of the infrared sensing module as shown in FIG. 2A.

Please refer to FIGS. 2A and 2B. FIG. 2A is a schematic enlarged fragmentary perspective view illustrating the infrared sensing module of the infrared-sensitive lighting device according to the embodiment of the present invention. FIG. 2B is a schematic perspective view illustrating a portion of the infrared sensing module as shown in FIG. 2A. As shown in FIGS. 2A and 2B, the infrared sensing module 30 comprises a casing 31, a circuit board 32, a sensor 33 and a lens cover 34. In FIG. 2B, the lens cover 34 is not shown. The casing 31 has a semispherical structure with an opening 310. The casing 31 of the infrared sensing module 30 is installed on the host 10. The circuit board 32 is disposed within the casing 31. The sensor 33 is installed on the circuit board 32 and aligned with the opening 310.

For effectively operating the infrared sensing module 30, the infrared sensing module 30 is located at a bottom side 13B of the host 10 (see FIG. 1B). Consequently, the infrared sensing module 30 is capable of performing a PIR sensing operation in a sensing range. The circuit board 32 is electrically connected with the associated circuit structure and other component. The sensor 33 is a passive infrared sensor (PIR sensor).

Particularly, the circuit board 32 comprises a sensing signal receiving and amplifying circuit (not shown). The sensing signal receiving and amplifying circuit includes at least one of a signal processor, a signal detector, a signal amplifier and a signal switch. The sensing signal receiving and amplifying circuit is used for amplifying a sensing result of the sensor 33 and outputting an amplified sensing result. According to the amplified sensing result, the host 10 controls a lighting behavior of the light-emitting module 20. According to the lighting behavior, the light-emitting module 20 selectively provides an illumination effect, a non-illumination effect or a partial illumination effect.

Nowadays, the sensor operated through a PIR sensing technology or a pyroelectric effect performs the sensing operation according to the temperature change. As known, the detection sensitivity decreases with the increasing distance. In case that an optical lens (e.g., a Fresnel lens) is arranged in front of the infrared sensor, the detection distance is increased and the judging accuracy is enhanced. For example, if no optical lens is arranged in front of the infrared sensor, the detection distance for the human body is smaller than 2 meters. Whereas, if an optical lens is arranged in front of the infrared sensor, the detection distance for the human body is larger than 7 meters.

Please refer to FIGS. 2A and 2B again. The lens cover 34 is arranged in front of the sensor 33. For increasing the sensing efficacy, the lens cover 34 has a lens pattern. In an embodiment, the lens pattern is composed with plural hexagonal patterns in a mosaic arrangement. That is, the lens pattern has a geometric shape similar to a honeycomb shape. Moreover, the plural hexagonal patterns are uniformly distributed on the main body of the lens cover 34. For increasing the sensing efficacy, the sensor 33 is located at a middle region of the opening 310 or located at a center of the semispherical lens cover 34.

Generally, the lens cover 34 or the lens pattern has a focusing function for refracting or reflecting the infrared signal to the sensor 33. Moreover, the lens cover 34 or the lens pattern has a function of dividing the sensing area into plural sub-areas. Consequently, when a human body enters the sensing area, the sensor 33 can sense the temperature change. In other words, the sensing efficacy of the sensor 33 is related to the lens cover 34 or the placement condition of the lens pattern.

In case that the characteristics of the sensor 33 and the lens cover 34 are tested and the placement relationship between the two components is integrated according to the performance, the area or the interested sub-area to be sensed by the sensor 33 can be effectively controlled. In accordance with a feature of the present invention, the lens cover is rotatably mounted on the opening 310 and the sensor 33 is correspondingly fixed. By simply rotating the lens cover 34 relative to the sensor 33, the sensing angle or direction can be adjusted.

According to the design of the present invention, the lens cover 34 is selectively operated in a first state or a second state. The first state is an initial state. When the lens cover 34 is rotated relative to the opening 310 and the lens cover 34 is in the first state, the sensor 33 performs a sensing operation at a first direction angle through the lens pattern 34. When the lens cover 34 is rotated relative to the opening 310 and the lens cover 34 is in the second state, the sensor 33 performs the sensing operation at a second direction angle through the lens pattern 34. The second direction is different from the first direction. That is, when the lens cover 34 in the first state is rotated at a specified angle, the lens cover 34 is in the second state. In this context, the first direction angle and the second direction angle are the angles in the three-dimensional space, including the horizontal left/right angles and the vertical depression/elevation angles. In other words, the sensing area under the lens pattern 34 is approximately a cone-shaped area or a fan-shaped area (see FIGS. 4A, 4B and 4C).

Please refer to FIGS. 2A and 2B again. For allowing the user to rotate the lens cover 34 relative to the opening 310, the lens cover 34 is further equipped with a rotary ring 341. The rotary ring 341 is aligned with the opening 310 and rotatably mounted on the opening 310. While the rotary ring 341 is rotated, the rotary ring 341 is coaxially rotated with the main body (or the lens pattern) of the lens cover 34. In an embodiment, the rotary ring 341 is integrally formed with the main body of the lens cover 34. In another embodiment, the rotary ring 341 and the main body of the lens cover 34 are separate components.

Figure 3A:
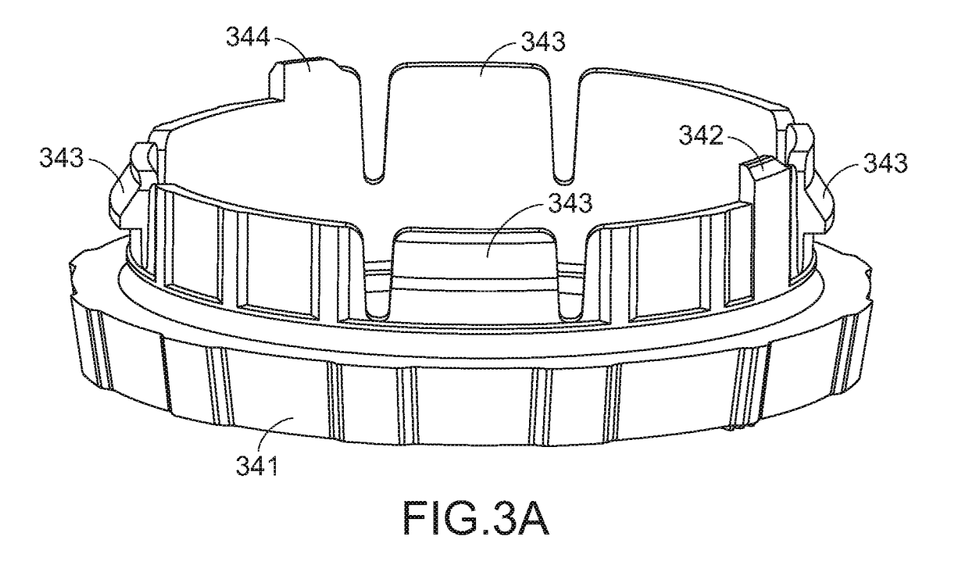
FIG. 3A is a schematic perspective view illustrating the rotary ring and associated components of the lens cover.
Figure 3B:
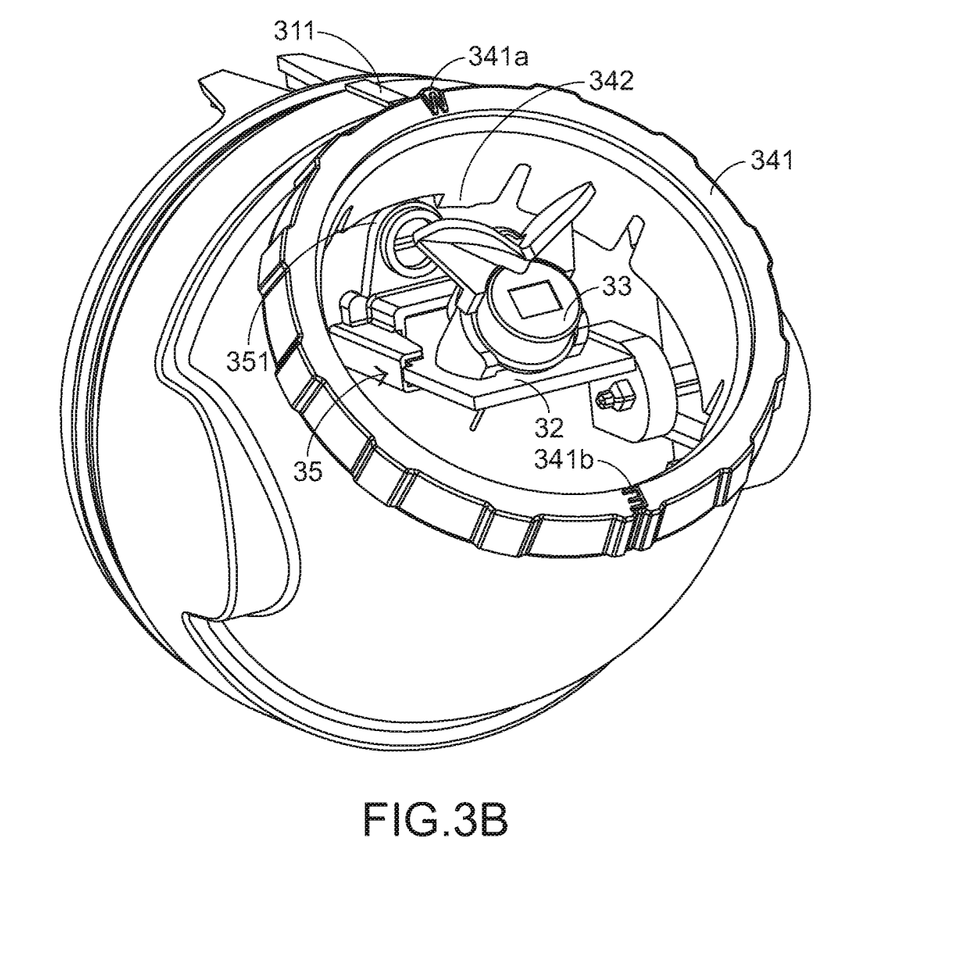
FIGS. 3B and 3C schematically illustrate the rotary ring that is fixed at two different positions.
Figure 3C:
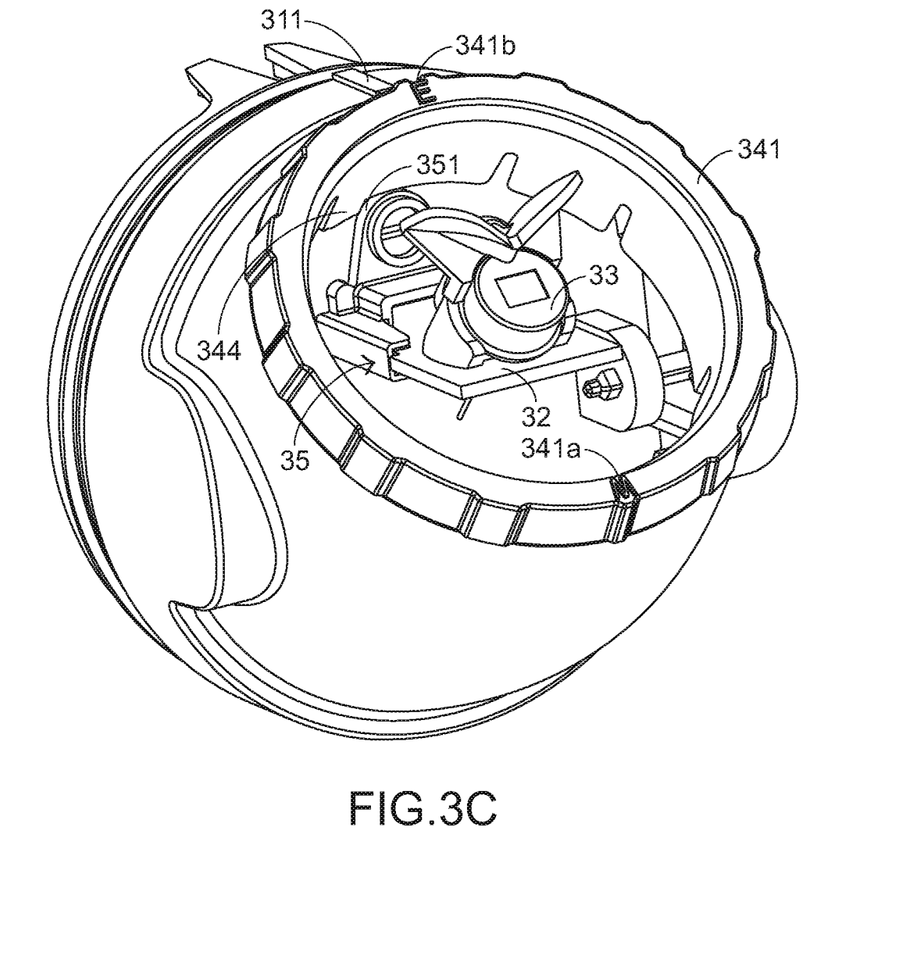

Please refer to FIGS. 3A, 3B and 3C. FIG. 3A is a schematic perspective view illustrating the rotary ring and associated components of the lens cover. FIGS. 3B and 3C schematically illustrate the rotary ring that is fixed at two different positions. As shown in FIGS. 3A, 3B and 3C, the lens cover 34 further comprises two protrusion structures 342 and 344. The two protrusion structures 342 and 344 are formed on an inner side of the rotary ring 341. Moreover, the two protrusion structures 342 and 344 have the functions of stopping rotation of the rotary ring 341. Due to the protrusion structures 342 and 344, the user may feel the rotation of the lens cover 34 and rotate the lens cover 34 or the lens pattern to the desired position.

Moreover, the shape (e.g., a circular shape) and size of the rotary ring 341 match the shape and size of the opening 310. In addition, the rotary ring 341 is equipped with plural elastic engaging structures 343. The plural elastic engaging structures 343 are formed on the inner side of the rotary ring 341. While the rotary ring 341 is pressed and inserted into the opening 310, the elastic engaging structures 343 are subjected to deformation. Consequently, the elastic engaging structures 343 are engaged with the inner periphery of the opening 310, and the rotary ring 341 is not detached from the opening 310. However, since the plural elastic engaging structures 343 are not completely locked on the inner periphery of the opening 310, the rotary ring 341 is allowed to be rotated relative to the opening 310.

The infrared sensing module 30 further comprises a clamping part 35. The clamping part 35 is disposed within the casing 31. The clamping part 35 is used for clamping and fixing the circuit board 32. The two protrusion structures 342 and 344 are formed on the inner side of the rotary ring 341 and protruded toward the circuit board 32. The lengths of the two protrusion structures 342 and 344 are determined according to a height of a position-limiting structure 351 of the clamping part 35.

Please refer to FIG. 3B. While the lens cover 34 is rotated in a specified direction (e.g., a counterclockwise direction), the position-limiting structure 351 of the clamping part 35 is contacted with and stopped by one of the two protrusion structures 342 and 344. Consequently, the rotary ring 341 is not continuously rotated. Please refer to FIG. 3C. While the lens cover 34 is rotated in another specified direction (e.g., a clockwise direction), the position-limiting structure 351 of the clamping part 35 is contacted with and stopped by another of the two protrusion structures 342 and 344. In such way, the user can recognize the two different states (e.g., the first state and the second state) of the lens pattern of the lens cover 34 relative to the sensor 33. It is noted that the position-limiting mechanism between the protrusion structures 342 and 344 and the position-limiting structure 351 may be varied according to the practical requirements.

As mentioned above, the infrared-sensitive lighting device has the inner positioning indication mechanism. Moreover, the external portion of the infrared-sensitive lighting device further comprises a positioning indication mechanism.

Please refer to FIGS. 2A to 3C. The casing 31 comprises an indication post 311. The rotary ring 341 has a first mark 341a and a second mark 341b. As the lens cover 34 is rotated and the first mark 341a is aligned with the indication post 311, the lens cover 34 is in the first state. As the lens cover 34 is rotated and the second mark 341b is aligned with the indication post 311, the lens cover 34 is in the second state. As shown in the drawings, the included angle between the first mark 341a and the second mark 341b is 180 degrees. In other words, when the lens cover 34 is rotated at 180 degrees, the lens cover 34 is switched from the first state to the second state or switched from the second state to the first state.

Figure 4A:
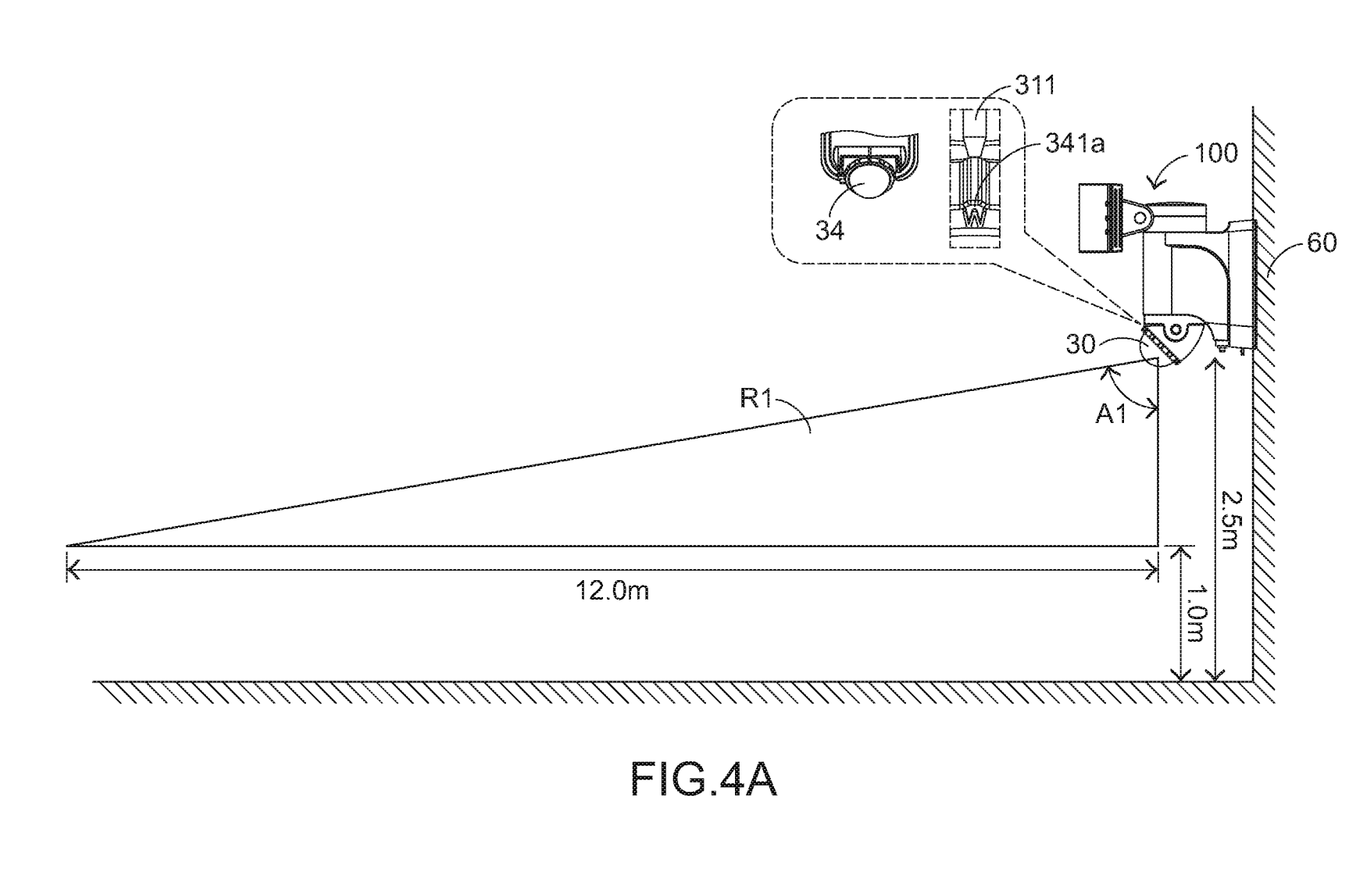
FIGS. 4A, 4B and 4C schematically illustrate some steps of testing the infrared-sensitive lighting device according to the embodiment of the present invention.
Figure 4B:
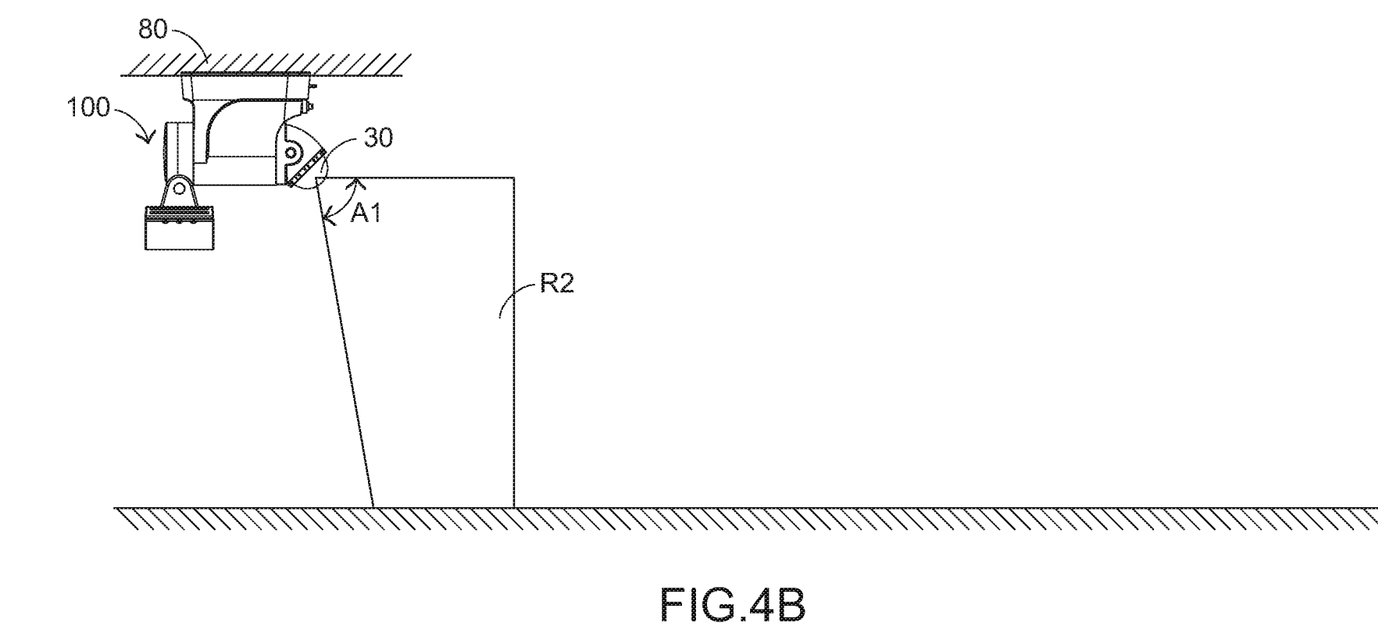
Figure 4C:
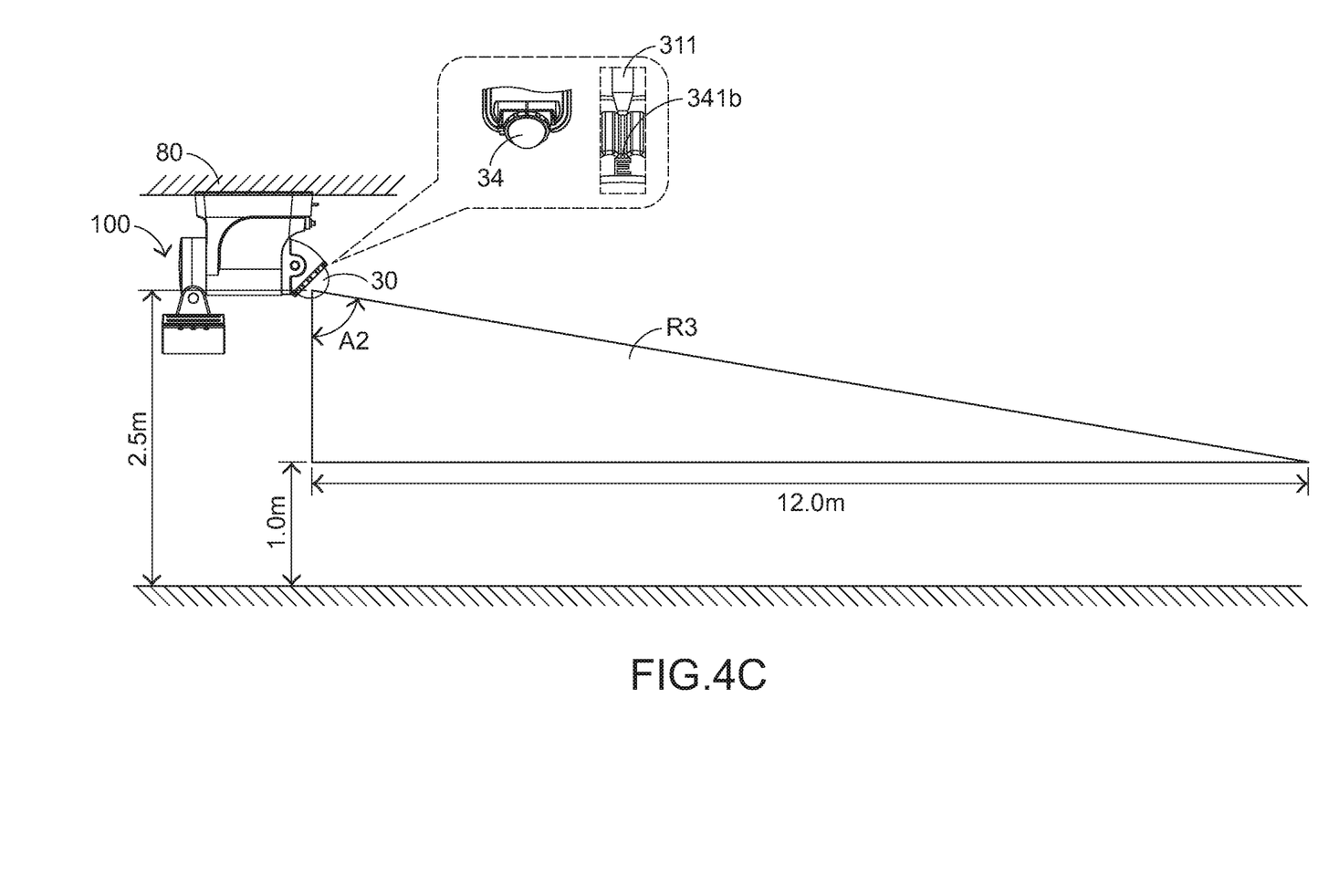

FIGS. 4A, 4B and 4C schematically illustrate some steps of testing the infrared-sensitive lighting device according to the embodiment of the present invention.

As shown in FIG. 4A, the infrared-sensitive lighting device 100 is installed on a wall 60. The first mark 341a of the rotary ring 341 is aligned with the indication post 311. That is, the lens cover 34 is in the first state. Under this circumstance, the infrared sensing module 30 performs a sensing operation at a first direction angle A1.

As shown in FIG. 4B, the infrared-sensitive lighting device 100 is installed on a ceiling 80. The first mark 341a of the rotary ring 341 is aligned with the indication post 311. That is, the lens cover 34 is in the first state. Under this circumstance, the infrared sensing module 30 performs the sensing operation at the first direction angle A1.

As shown in FIG. 4C, the infrared-sensitive lighting device 100 is still installed on the ceiling 80. The rotary ring 341 of the lens cover 34 shown in FIG. 4B is rotated such that the second mark 341b is aligned with the indication post 311. That is, the lens cover 34 is in the second state. Under this circumstance, the infrared sensing module 30 performs the sensing operation at a second direction angle A2.

In FIGS. 4A, 4B and 4C, the areas R1, R2 and R3 denote the effective sensing areas. In the step of FIG. 4B, the first direction angle A1 for the sensing operation is not adjusted. Meanwhile, the sensing area is not suitable for performing the sensing operation, or the judgment according to the sensing result is not satisfied. After the rotary ring 341 of the lens cover 34 shown in FIG. 4B is rotated, the second direction angle A2 shown in FIG. 4C is suitable for performing the sensing operation.

The first direction angle A1 shown in FIG. 4A and the second direction angle A2 shown in FIG. 4C are related to the suitable sensing area. The sensing area is defined by a first side (e.g., a vertical side), a second side and a third side (e.g., a horizontal side) collaboratively. The first side is directly located under the infrared sensing module 30. The included angle between the first side and the second side is about 80 degrees. The length of the first side is 1.5 meter. The length of the third side is about 12 meters.

In the above embodiment, the protrusion structures 342 and 344 are used as the inner positioning indication mechanism, and the marks 341a and 341b are used as the external positioning indication mechanism. The protrusion structures 342 and 344 and the marks 341a and 341b assist the user in rotating the lens cover 34. In practice, only one kind of positioning indication mechanism is feasible. In case that the user is able to adjust the desired sensing angle or direction, the positioning indication mechanism may be omitted.

It is noted that the examples or drawings of the lens cover 34 or the rotary ring 341 are not restricted. As long as the above purposes can be achieved, the structure of the lens cover 34, the rotary ring 341 or the positioning indication mechanism may be varied according to the practical requirements. For example, in another embodiment, the lens cover 34 further comprises a waterproof ring (not shown) for preventing the moisture from entering the infrared sensing module 30. The waterproof ring is formed on the inner side of the rotary ring 341 and aligned with the periphery of the opening 310. When the rotary ring 341 is assembled with the opening 310, the waterproof ring can reduce the gap between the rotary ring 341 and the opening 310.

From the above descriptions, the present invention provides an infrared-sensitive lighting device. In case that the infrared-sensitive lighting device is installed in different environments, the sensing angle or direction can be effectively adjusted. Consequently, the applications of the infrared-sensitive lighting device become more diverse, and the function of automatically controlling the lighting operation is achievable.

In other words, the infrared-sensitive lighting device of the present invention can overcome the drawbacks of the conventional technologies while achieving the objects of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An infrared-sensitive lighting device, comprising:
   a host installed on an installation surface;
   a light-emitting module disposed on the host, wherein the light-emitting module emits a light beam to provide a lighting behavior; and
   an infrared sensing module comprising a casing, a circuit board, a sensor and a lens cover, wherein the casing is installed on the host and has an opening, the circuit board is disposed within the casing, the sensor is installed on the circuit board and aligned with the opening, the lens cover is rotatably mounted on the opening, and the lens cover has a lens pattern, po1 wherein when the lens cover is rotated relative to the opening and the lens cover is in a first state, the sensor performs a sensing operation at a first direction angle through the lens pattern, wherein when the lens cover is rotated relative to the opening and the lens cover is in a second state, the sensor performs the sensing operation at a second direction angle through the lens pattern.

2. The infrared-sensitive lighting device according to claim 1, wherein the sensor is a passive infrared sensor.

3. The infrared-sensitive lighting device according to claim 1, wherein the light-emitting module comprises one or more light-emitting diode units.

4. The infrared-sensitive lighting device according to claim 1, wherein the infrared-sensitive lighting device is connected with a power source to receive electric energy, wherein the power source is a utility power source, a battery group or a solar power module.

5. The infrared-sensitive lighting device according to claim 1, wherein the installation surface is a wall or a ceiling, the host has a backside, and the backside of the host is installed on the wall in a wall-mounting manner or installed on the ceiling in a suspension manner.

6. The infrared-sensitive lighting device according to claim 1, wherein the circuit board comprises a sensing signal receiving and amplifying circuit for amplifying a sensing result of the sensor and outputting an amplified sensing result, wherein according to the amplified sensing result, the host controls the lighting behavior of the light-emitting module.

7. The infrared-sensitive lighting device according to claim 1, wherein the lens cover further comprises two protrusion structures, and the infrared sensing module further comprises a clamping part for clamping the circuit board, wherein while the lens cover is rotated and a position-limiting structure of the clamping part is contacted with and stopped by one of the two protrusion structures, the lens cover is in the first state or the second state.

8. The infrared-sensitive lighting device according to claim 7, wherein the lens cover further comprises a rotary ring, wherein the rotary ring is aligned with the opening and rotatably mounted on the opening, and the two protrusion structures are formed on an inner side of the rotary ring and protruded toward the circuit board.

9. The infrared-sensitive lighting device according to claim 8, wherein the casing comprises an indication post, and the rotary ring has a first mark and a second mark, wherein when the lens cover is rotated and the first mark is aligned with the indication post, the lens cover is in the first state, wherein when the lens cover is rotated and the second mark is aligned with the indication post, the lens cover is in the second state.

10. The infrared-sensitive lighting device according to claim 8, wherein the lens cover further comprises a waterproof ring, wherein the waterproof ring is formed on the inner side of the rotary ring and aligned with a periphery of the opening.

11. The infrared-sensitive lighting device according to claim 1, wherein when the lens cover is rotated at 180 degrees, the lens cover is switched from the first state to the second state or switched from the second state to the first state.

12. An infrared-sensitive lighting device, comprising:
    a host installed on an installation surface;
    a light-emitting module disposed on the host, wherein the light-emitting module emits a light beam to provide a lighting behavior; and
    an infrared sensing module comprising a casing, a circuit board with a sensor, and a lens cover, wherein the casing is installed on the host and has an opening, the circuit board is fixed in the casing and aligned with the opening, the lens cover is rotatably mounted on the opening, and the lens cover has a lens pattern, po1 wherein when the lens cover is rotated relative to the opening and the lens cover is in a first state, the sensor performs a sensing operation at a first direction angle through the lens pattern, wherein when the lens cover is rotated relative to the opening and the lens cover is in a second state, the sensor performs the sensing operation at a second direction angle through the lens pattern.

13. The infrared-sensitive lighting device according to claim 12, wherein the installation surface is a wall or a ceiling, the host has a backside, and the backside of the host is installed on the wall in a wall-mounting manner or installed on the ceiling in a suspension manner.

14. The infrared-sensitive lighting device according to claim 12, wherein the circuit board comprises a sensing signal receiving and amplifying circuit for amplifying a sensing result of the sensor and outputting an amplified sensing result, wherein according to the amplified sensing result, the host controls the lighting behavior of the light-emitting module.

15. The infrared-sensitive lighting device according to claim 12, wherein the lens cover further comprises two protrusion structures, and the infrared sensing module further comprises a clamping part for clamping the circuit board, wherein while the lens cover is rotated and a position-limiting structure of the clamping part is contacted with and stopped by one of the two protrusion structures, the lens cover is in the first state or the second state.

16. The infrared-sensitive lighting device according to claim 15, wherein the lens cover further comprises a rotary ring, wherein the rotary ring is aligned with the opening and rotatably mounted on the opening, and the two protrusion structures are formed on an inner side of the rotary ring and protruded toward the circuit board.

\* \* \* \* \*